United States Patent [19]

Jones et al.

[11] Patent Number: 4,580,230

[45] Date of Patent: Apr. 1, 1986

[54] CATHODE RAY TUBE CONTROLLER

[75] Inventors: John W. Jones, Winchester; Vincent P. Thomas, Eastleigh, both of England

[73] Assignee: International Business Machines Corporation, Armonk, N.Y.

[21] Appl. No.: 571,415

[22] Filed: Jan. 17, 1984

[30] Foreign Application Priority Data

Jun. 30, 1983 [EP] European Pat. Off. ........ 83303791.4

[51] Int. Cl.⁴ .......................... G06K 15/20; G06F 3/14

[52] U.S. Cl. .................................... 364/521; 340/750; 340/801; 315/364

[58] Field of Search ................ 364/521; 340/750, 798, 340/801; 315/364, 379; 358/93, 217, 337, 379

[56] References Cited

U.S. PATENT DOCUMENTS

| | | | |
|---|---|---|---|
| 4,074,359 | 2/1978 | Hasenbalg | 315/364 X |
| 4,104,624 | 8/1978 | Hamada | 340/750 |
| 4,107,664 | 8/1978 | Marino | 315/364 X |
| 4,169,262 | 9/1979 | Schwartz et al. | 340/744 |
| 4,177,462 | 12/1979 | Chung | 340/703 |
| 4,188,627 | 2/1980 | Alexander et al. | 315/364 X |
| 4,379,293 | 4/1983 | Boisvert et al. | 340/750 |
| 4,390,780 | 6/1983 | Wu et al. | 364/521 X |
| 4,408,197 | 10/1983 | Komatsu et al. | 340/750 X |

OTHER PUBLICATIONS

"Electronic Design", vol. 27, No. 13, Jun. 21, 1979, pp. 94–102, C. Melear et al—Simplify Video—Display Design by Using a Versatile IC Controller.

*Primary Examiner*—Edward J. Wise
*Attorney, Agent, or Firm*—Joseph J. Connerton

[57] ABSTRACT

A cathode-ray tube controller uses a content addressable associative storage array (10) to generate repetitively a sequence of video control signals for a CRT to which it is attached. A binary coded counter (4) incremented by the system clock (CL) of the CRT provides a sequence of binary count values representing the running count of the CRT clock. This running count is continuously available and applied as an input search argument to the associative array. A plurality of predetermined count values, derived with reference to the running count, are stored as binary coded words in selected rows of the associative array. The match signals generated on the sense lines of the array as the running count value becomes equal to the predetermined count values in the array provide the video control signals to control the various display functions of the CRT. One of the signals is used to re-set the running count value so that the sequence of signals is repeated at regular intervals. The timing of the video control signals is determined solely by the running count values entered into store. An input data register (15) is provided in order to load words into the array to define or to change the functions of display. A read register (17) is provided in which interrogated words are read for test and event timing purposes.

8 Claims, 7 Drawing Figures

CATHODE RAY TUBE CONTROLLER

BACKGROUND OF THE INVENTION

The invention relates in general to a cathode ray tube controller to interface cathode ray tube (CRT) raster scan displays with a processor such as a microcomputer and in particular to a programmable display control module forming part of the controller for providing video timing controls for the CRT.

As with programming where the need to design very large programs dictated a structured approach, so the problems of VLSI lead to the search for structures logic arrays, the programmable logic array being the best example so far. In the display controller application there is a recurrent need to compare a pre-set value with a running count, for example to give cursor position, end of line, end of frame, etc.

The obvious approach is to load the required pre-set value into a register and use an exclusive OR function to provide an event match between the stored value and the system clock supplied over a suitable bus. This basic compare function is repeated as often as it is necessary. Most requirements will have two such structures for example one comparing a character count with a pre-set value and the other comparing a row count with another pre-set value. A logical AND of the two comparisons is used to give the event match. In a further requirement, the event match signal is used to set a latch and a similar repeated structure is provided to re-set the latch. All three of these arrangements are required many times over on a CRT controller chip and the eventual silicon layout is both inefficient and difficult to implement, change and test.

Typical of such integrated devices are the modern CRT controllers such as the Motorola MC 6845 CRT Controller; the Intel 8275 Programmable CRT Controller; and the Intel 8276 Small System CRT Controller.

The Motorola MC6845 CRT Controller (CRTC) is representative of the state-of-the art at the time that the present invention was made and is now briefly described. This CRTC performs the interface to raster scan CRT displays and provides video timing and refresh memory addressing. The CRTC consists of programmable horizontal and vertical timing generators, programmable linear address register, programmable cursor logic, light pen capture register, and control circuitry for interface to a processor bus. All CRTC timing is derived from a clock running at the character rate. Coincidence circuits continuously compare character counter contents with the contents of a number (eighteen) of programmable registers to provide, among other functions, horizontal timing (HSYNC), vertical timing (VSYNC), cursor location and size, etc. The processor communicates with the CRTC through a data bus into the register file of the CRTC and normally loads the CRTC registers sequentially from a firmware table during initialization after the power is turned on. The CRTC is provided as a single chip implemented using VLSI techniques.

Although a considerable improvement over the original controllers that used hard-wired gates to decode states represented by particular counts, these modern controllers suffer from two main disadvantages. The first disadvantage is that the complex combination of the various basic circuits required to perform the CRT timing control result in a complex cell topology. This generally results in an inefficient use of silicon when the chip is constructed. This leads directly to the second disadvantage in that once the complex topology of the cell has been determined and laid out in silicon then, generally speaking, it is not possible to change it without redesign of a new cell. Although there is some flexibility in that the pre-set values loaded in the registers can be changed during initialization, such implementations require all main features of the controller to be specified beforehand and designed in at the outset. If it is subsequently decided that an additional feature is required, then the chip must be redesigned with a new layout including the new feature. Naturally this is an extremely time consuming and often expensive operation.

SUMMARY OF THE INVENTION

The present invention provides a CRT controller operable in use to generate video timing control signals for a CRT to which it is connected, the individual timing of each timing control signal being determined with reference to the running count value of a counter connected to receive and be continuously incremented by an input pulse train derived from the scan controlling clock of the CRT, characterized in that said controller comprises an associative storage array into which, during a write mode of operation, words each representing by its binary content a predetermined count value are written, said running count value available during a search mode of operation from a counter as an incrementing sequence of binary signals being applied to said array as a search argument, whereby each individual timing control signal is provided as a respective output signal from the array in response to the occurrence of a match between the binary signals representing the current running count value and the binary content of a predetermined word count value stored in the array for the purpose of defining that timing control signal.

One considerable advantage of using a content addressable or associative memory for providing the timing functions of a CRTC is that the regularity of the array is eminently suited for a VLSI package thus simplifying manufacture and reducing cost. The function of the controller according to the invention is similar to that of the prior art with the important difference that each register containing a pre-set value is replaced by a word in a memory-like array. Furthermore, the exclusive OR function is replaced by an associative function adjunct to the cell in the word. The structure offers reduced silicon area with simplified and structured controls for reading, writing and associative searching. A further advantage is provided in that testing of the array contents is simplified since each test is performed on all words in the array in parallel. The interface to the control system is simple relative to that of the prior art using individual registers. Finally, since the array is writable, the functions of the CRTC can be modified even after it has been built as a VLSI chip thus allowing configuration at run-time and is readable at any time for test purposes.

BRIEF DESCRIPTION OF THE DRAWINGS

In order that the invention may be fully understood, a preferred embodiment thereof will now be described with reference to the accompanying drawings. In the drawings.

DESCRIPTION OF A PREFERRED EMBODIMENT

Figure 1:
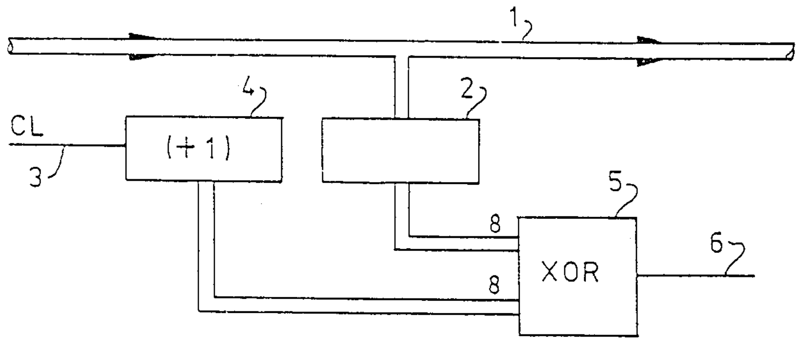
FIG. 1 shows schematically a comparison circuit typically used in state-of-the art display controllers.

In FIG. 1 a character count value selected with reference to the character count clock of a CRT to be controlled and thus representing by its magnitude a predetermined position of the scanning electron beam on the screen of the CRT is supplied over an 8-bit bus 1 from a processor (not shown) and loaded into an 8-bit register 2. The CRT character clock CL running in synchronism with the scanning electron beam of the CRT, and thus, during normal scanning operations representing the actual position of the beam on the screen, is supplied subsequently over clock line 3 and used to increment a counter 4. These two values, namely the pre-set count value in register 2 and the running character count value in counter 4 are supplied as inputs to an 8-bit exclusive OR gate 5. An event match generates a signal on output line 6 when the scanning electron beam has reached the predetermined position on the screen defined by the pre-set count value in register 2. Such an arrangement forms the basis of the circuits used by prior art devices to provide the necessary video timing controls during the scan cycle of a CRT.

In practice, as is well known, the position of the scanning electron beam is not tracked by a single counter continuously incremented while the beam scans the entire screen. Instead a column counter increments once for each character position and is re-set at the end of each row scanned. A row counter increments once for each complete row of characters scanned and is re-set at the end of each field in the vertical direction. Often where characters are displayed, two counters are employed, one the line or 'slice counter' counting the number of scan lines or 'slices' making up each row of characters and the other the 'row counter' as referred to already counting the number of character rows making up the entire field scan.

Figure 2:
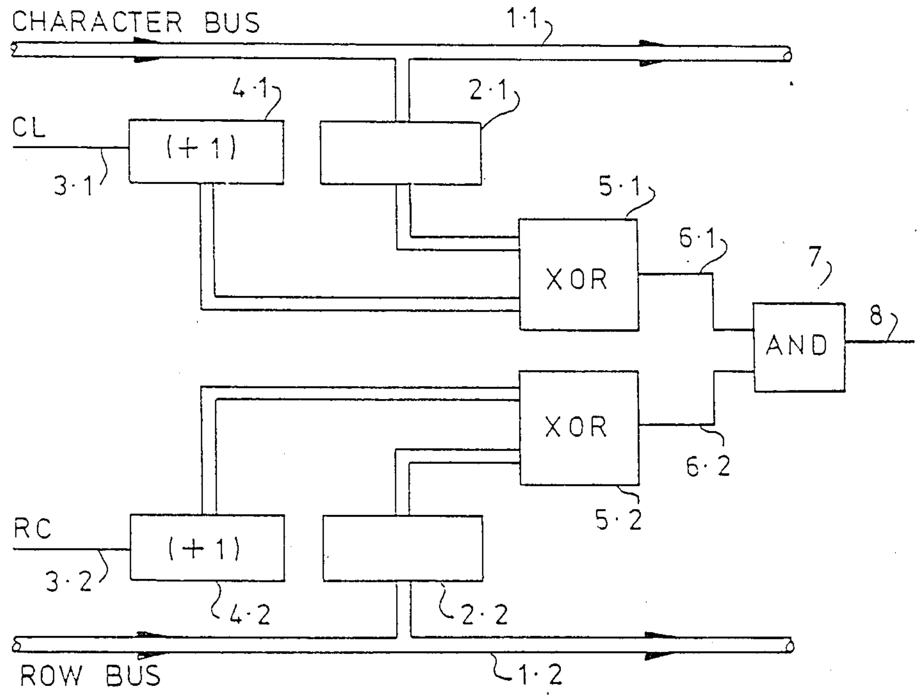
FIG. 2 shows a development of the basic circuit of FIG. 1 employing a character counter and row counter to define a character position on a CRT screen.

In FIG. 2, the same base reference numerals are used as in FIG. 1 but with added digits to distinguish between duplicated circuits. Thus in this figure, a character count indicating a character or column position in a row is supplied over 8-bit character lines 1.1 and loaded into an 8-bit character register 2.1. A character clock CL on clock line 3.1 increments a character counter 4.1 as the beam scans each character position of each row of the display. A signal on the output 6.1 of XOR 5.1 whenever a match occurs between the contents of register 2.1 and the contents of character counter 4.1 indicates when the scanning mechanism, and thus the scanning electron beam, is addressing the desired character position in each row.

A row counter indicating which row of the display contains the desired character position is supplied over 8-bit row bus 1.2 and loaded into an 8-bit row register 2.2. A row clock RC on clock line 3.2 derived by suitable division of the character clock CL (or any other suitable clock reference) increments a row counter 4.2 as the beam scans each character row of the display. A signal on the output 6.2 of XOR 5.2 whenever a match occurs between the contents of register 2.2 and the contents of row counter 4.2 indicates when the desired row is being scanned.

The two XOR outputs 6.1 and 6.2 from the duplicated event matching circuits are supplied as inputs to AND gate 7. A signal appears on its output 8 only when the required character position on the required row is being scanned. Such a circuit is typically used for example to identify cursor position on a CRT display device.

Figure 3:
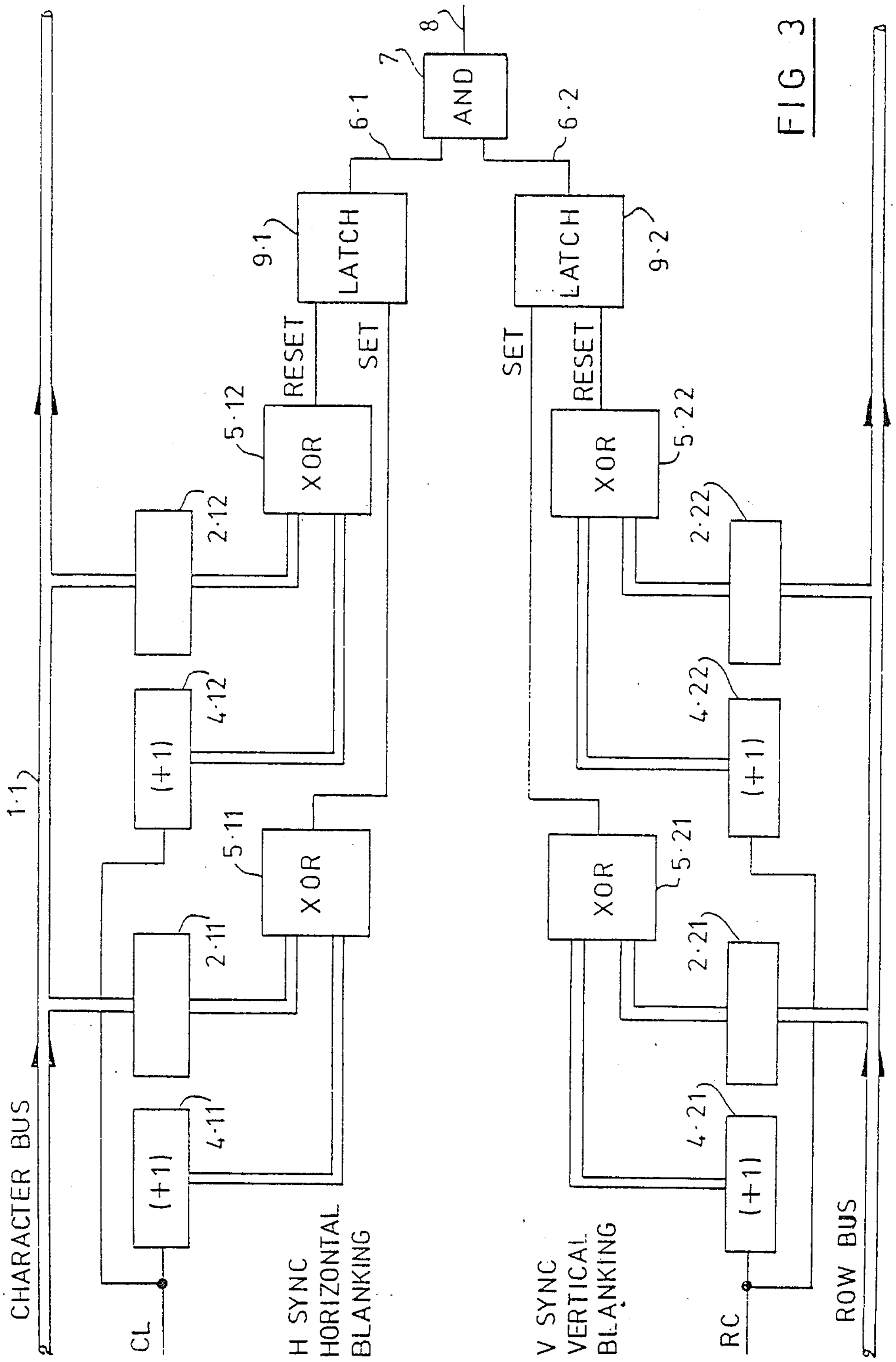
FIG. 3 shows a further development of the basic circuits of FIG. 1 and FIG. 2 where in each of two halves of the circuit an event match is used to set a latch and a similar structure is used to re-set the latch.

In FIG. 3 the same base reference numerals are used as before with further digits added to indicate further duplication of like components. In this arrangement, a specified left-hand character row position is entered in character register 2.11 and a specified right-hand character row position in character register 2.12. Similarly a specified upper row position is entered in row register 2.21 and a specified lower position in row register 2.22. Thereafter during scanning, each time the specified left-hand character position on a row is reached (a condition signalled by XOR 5.11 detecting coincidence between the contents of character counter 4.11 and left-hand character register 2.11) latch 9.1 is set. Each time the specified right-hand character position on a row is reached (a condition signalled by XOR 5.12 detecting coincidence between the contents of character counter 4.12 and right-hand character register 2.12) latch 9.1 is re-set. This is typical of the type of circuit required for example to set the timing and duration of horizontal synch or line blanking signals for a CRT display device.

Similarly, when the specified upper row value is reached (a condition signalled by XOR 5.21 detecting coincidence between the contents of row counter 4.21 and upper row register 2.21) latch 9.2 is set. When the specified lower row value is reached (a condition signalled by XOR 5.22 detecting coincidence between the contents of row counter 4.22 and the lower row register 2.22) latch 9.2 is re-set. This portion of the circuit is typical of that used for example to set the number of rows in the displays or the region of vertical blanking.

The output on lines 6.1 and 6.2 now appearing from the latches 9.1 and 9.2 respectively are again connected as inputs to AND gate 7 to produce an event match signal whenever the scanning electron beam lies between the two specified extreme character positions in a row and between the two specified extreme row position on the screen. Such a circuit is typically used for example to define screen data or video display area or screen partition.

All the circuit arrangements shown in FIG. 1, FIG. 2 and FIG. 3 are typical of what is required to perform all the functions required by a display controller. It is seen therefore that the complexity of the complete circuit makes its implementation as an integrated circuit or a silicon chip difficult and therefore expensive. In essence a prior art CRTC is custom built in order to perform the functions defined. Further functions cannot be added without redesign of a new custom built chip with appropriate layout.

The present invention overcomes these problems in a simple yet extremely effective way, by the use of a content addressable memory or associative storage array to provide event matching to generate the video control signals for a CRT display device to which the controller is connected.

Figure 4:
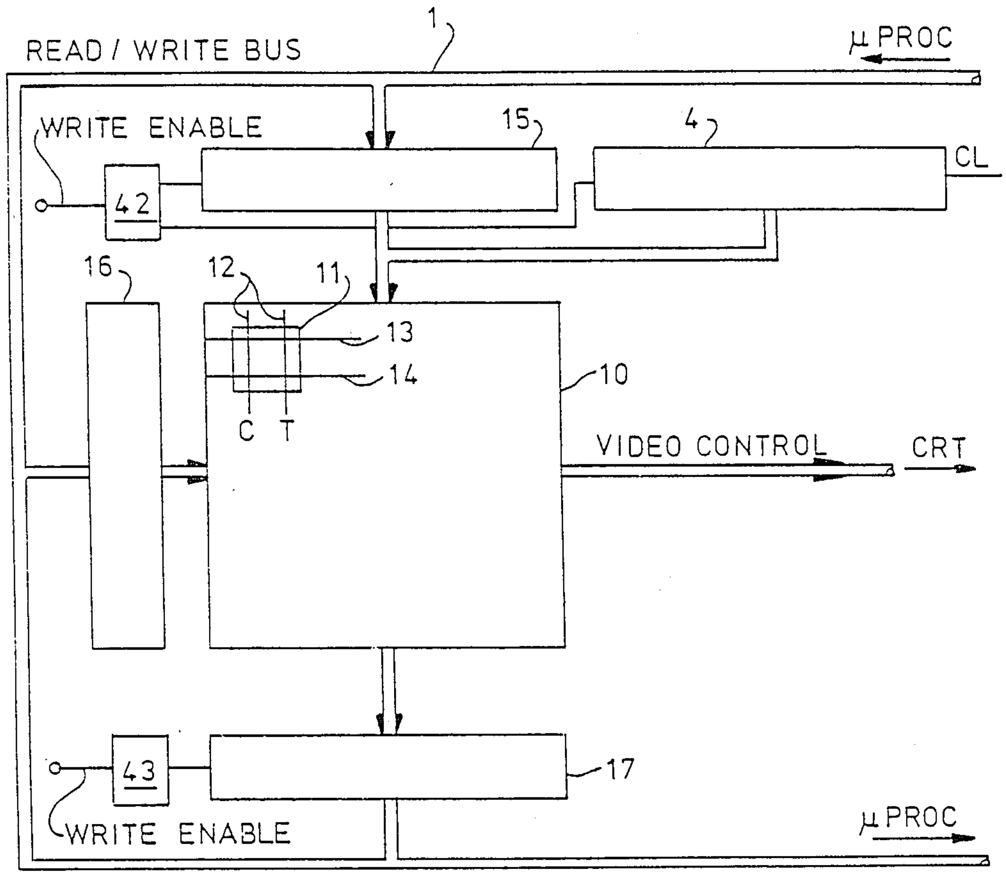
FIG. 4 shows schematically a CRT controller in accordance with the present invention.

The CRT controller according to the invention shown schematically in FIG. 4, includes an associative array 10 having a regular two dimensional matrix structure of two-state storage cells 11 (don't care states are not required in this implementation). In this figure only one associative array cell 11 is shown for the sake of simplicity. Each cell and its operation will subsequently be described in detail with reference to FIG. 5. However, for the purposes of this initial simplified description of operation of the controller it is only necessary to know that each cell has a pair of bit lines 12 (true and complement) extending in the column direction of the array, and a read/write select line 13 and a sense line 14 both extending in the row direction of the array. The usual arrangement exists in which the individual cells 11 in the same column of the array share a common pair of bit lines and the individual cells in the same row share the same read/write select line and sense line. (In some cases sense line may be broken to provide in effect two sense lines for the cells in that row. The purpose of this will be made clear hereinafter).

Pre-determined values representing the various beam scan position over the CRT screen at which video and other control signals are required to be generated for the scan control and other functions of the CRT are loaded into the associative array 10 over read/write bus 1 from a controlling processor or microprocessor (not shown). The associative array 10 is word organized. That is, the individual bits forming each 'word' of predetermined value are supplied in parallel to the columns or bit line pairs 12 of the array and stored in a predetermined row of the array. In order to do this, the individual words are loaded in a predetermined sequence one at a time into a data write register 15. The contents of the register 15 are read out to the array at write time under control of a write enable circuit 42 controlled by a write enable signal supplied on input line 43. The words loaded into the register 15 are typically derived from a firmware table available for access by the processor and supplied to the data write register 15 under control of the processor. Coincidentally, a read/write select line 13 associated with the selected row of the array to which the word is to be written is selected by a word address register 16 decoding a word row address sent over the bus 1 from the microprocessor. The combination of the pattern representing the pre-set value (that is the word) applied to the bit lines and the energization of the read/write select line associated with the required row of the array results in the word being loaded into the array in the specified bit positions of the specified row. The process of loading individual words into the data write register 15 and thereafter transforming the contents of the register 15 to a specified row of the array 10 is repeated during write time until all the words representing all the required pre-set values necessary for the control of the CRT have been loaded.

Following this initialization of the controller by loading the predetermined word count into the array 10, a testing procedure may be invoked to check that the correct values have in fact been written to the array. The test procedure involves sequentially interrogating the contents of the array by reading out its contents one row at a time under control of the word address register 16 into a data read register 17, and thence over the read/write bus 1 back to the processor for checking. The outputs from the counter 4 and data write register 15 are disabled during read time which is performed under control of read enable circuit 43 receiving as input a write enable signal. The function of this circuit 43 will be described in more detail hereinafter with reference to FIG. 6. Once the associative array has been loaded in this manner with these pre-set values and the accuracy of its contents verified by the testing procedure, the controller is ready for use to provide timing controls for the CRT display device for which is has been uniquely programmed.

During operation a counter 4 is continuously incremented by the character clock CL supplied over the line 3 in the usual manner. The individual stages of the counter 4 are connected in parallel to the same bit lines 12 of the associative array 10 as are the corresponding stages of the data write register 15. The output from the counter is disabled during write time by a signal from write enable circuit 42. During search time the signals from the circuit 42 disable the output from the register 15 and enable the output from the counter 4. The function of this circuit 42 will be described in more detail hereinafter with reference to FIG. 6. By this means the CRT running character count is applied during search time in parallel as a search argument to the bit lines of all the words in the array. Since each bit in a word written to the array is supplied from the data write register 15 in true and complement form, so each bit of the running count value from counter 4 is supplied to the array in the same manner. The function of the associative array is such that whenever a match occurs between the running count and a word stored in the array, an event match signal is produced on a sense line 14 associated with the row of the array containing that word. A match signal on a sense line from the array appears at a time determined by the value of the word written to the array and selected in accordance with the control requirements of the CRT. In some cases the event match signal may be supplied directly to the CRT or be used to set or re-set a latch and thus provide indirect control. In this figure the output lines and latches are shown generally as a video control bus for the CRT to which it is connected.

The use of an associative array in this manner to detect event matching provides the controller with considerable flexibility. Thus for example, one word may be used to specify a value which when matched by the running count is used to set a latch to indicate the start of an event, and another word when matched may be used to re-set the latch when the event is to be terminated. Such a timing system would be employed for example to specify the boundaries on the screen of the horizontal blanking region, or the extent of a display partition on the screen.

A further important advantage of the present invention derives from the realization that it is not always necessary to use an entire array row to store a single word. In some cases a word line can be separated into two portions, so that the left-hand portion stores one word and provides one control function and the right-hand portion stores another word and another control function. An associative array is particularly suited for this type of organization which makes it possible to make efficient use of its storage space and thus efficient utilization of silicon when implemented as a VLSI chip. An example of the type of video timing signals generated by such an array will be given hereinafter with reference to FIG. 7 and the detailed embodiment of the invention will be described with reference to FIG. 6. First, however, the structures and operation of an associative cell 11 forming the basis of the associative array will be described.

Each cell 11 of the associative array 10 consists basically of a standard cross-coupled RAM cell formed from six field-effect transistors D1 to D6. The storage element of the cell consists of two cross-coupled devices D3 and D4 connected in conventional manner via load devices D1 and D2 between a positive supply line 18 and ground line 19. In the convention selected in this particular application, a binary '1' is represented by a cell when device D3 is conducting and device D4 non-conducting and a binary '0' is when D3 is non-conducting and D4 conducting. The cell is connected to a read/write address line 13 via the two devices D5 and D6, and to the true and complement bit lines 12 via devices D8 and D7 respectively. A further device D9 is driven by the common drains of devices D7 and D8 and is able to pull the sense line 14 to ground. As will be clearly understood, cells 11 in the same row of the array are linked by common supply lines 18 and 19 and read/write address line 13 all extending in the row direction. Similarly, cells in the same column of the array are linked by common pairs (true and complement) of bit lines 12 extending in the column direction.

Each sense line 14 is connected at one end to a conventional 'pull-up' device 20 consisting of a single field-effect device D10 connected between the line and a sense enable line 40. The function of the 'pull-up' circuit is to hold the sense line linking all the cells in the associated row to which it is connected at a high potential (5V) when the sense enable signal is at a high value. When the sense enable signal is at a low value the sense line is effectively disabled. Each pair of bit lines 12 in each column of the array is connected to a conventional pre-charge circuit 21 which is required for conducting read operations and is also used but is not essential for write operations. The pre-charge circuit consists of devices D11 and D12 which when made conducting by a pulse on pre-charge input line 22 momentarily connects the associated bit line pair to a positive supply line 23 so charging up the lines. The pre-charging of the lines is equalized by the provision of a further interconnecting device D13.

WRITE OPERATION

Differential input data supplied to a bit line pair determines the subsequent binary storage state of the cell. Thus to write a binary '1' in a cell, the true bit line 12 is held at a high potential and the complement bit line is held at a low potential. If when this differential input signal is being applied the read/write select line 13 (which is normally held at a low potential) is raised, then the cell becomes set with device D3 on and D4 off representing the binary '1' state. This condition is maintained even after the potential on the read/write select line 13 has dropped to its normal low level. In order to write a binary '0', the same procedure is followed but this time with the true bit line held at a low potential and the complement bit line held at a high potential so that device D3 becomes non-conducting and device D4 becomes conductive. As mentioned hereinbefore, the bit line pair may be pre-charged before writing by operation of the pre-charge circuit 21 although this is not essential.

Clearly, in order to write a complete word into a selected row of the array 10, a pattern of differential signals representing the individual binary values of the word are applied in parallel to the bit line pairs of the array. The desired row is then selected by raising the potential on the read/write select line 13 associated with that row resulting in the cells in the row being set in the required pattern of '1's and the '0's representing input data word. During a write operation the sense enable signal is down as will be described in detail hereinafter and the sense line associated with the word of the array being written is disabled, so preventing spurious sense signals from being produced which may be misinterpreted.

READ OPERATION

In order to speed up a read operation, the bit line pairs associated with all the cells are pre-charged by pre-charge circuits 21 connected one to each bit line pair by application of a pre-charge signal on input line 22 common to all pre-charge circuits. Following pre-charging of the bit lines, the cell contents of a row are interrogated simply by raising the potential on the read/write select line 13 associated with that row from its inactive down level to its high level. This results in differential signals representing the state of each cell appearing on each bit line pair 12 of the cells associated with the interrogated word. Thus interrogation of a cell storing a binary '1' with D3 on and D4 off produces differential voltage on the bit line pair, namely low on the complement bit line and high on the true bit line, which is recognized as representing a binary '1' state. Similarly interrogation of a cell storing a binary '0' with D3 off and D4 on, produces differential voltage on the bit line pair, namely high on the complement bit line and low on the true bit line, which is recognized as representing a binary '0' state. During a read operation the sense enable signal is down and the sense line associated with the word of the array being read is disabled so preventing spurious sense signals from being produced which may be misinterpreted.

SEARCH OPERATION

As associative search operation is similar to a read operation except that the read/write select line 13 is held inactive at its down level. A differential signal representing a binary condition is applied as input data to the bit line pair 12 of the cell. The resultant signal on the sense line 14 indicates whether the contents of the cell match the input data or not. Assume, for example, that the cell is storing a binary '1' (Device D3 is conducting and D4 non-conducting) and is interrogated for a binary '1' by the application of an appropriate input differential signal to the bit line pair (true line potential high, complement line potential low). The sense line 14 is normally held at the supply potential by the pull-up circuit 20. Since device D3 is conducting, device D7 is also conducting and accordingly device D8 is non-conducting. The interrogation of the cell under these conditions results in the potential (low) on the complement bit line to be gated to the gate control of device D9 which is thus turned off. Consequently the potential on the sense line remains high the condition indicating a match of input search data with the storage state of the cell.

Assume conversely that the cell is storing a binary '0' (device D3 and D7 are both non-conducting and D4 and D8 are both conducting) and is interrogated for a binary '1'. In this case the device D8 gates the potential of the true (high) bit line to the gate control of device D9 which switches on pulling the sense line potential from the supply down to ground. This fall in sense line potential indicates a mismatch of input search data with the storage state of the cell.

With a cell storing a binary '1' (devices D3 and D7 are conducting and D4 and D8 are non-conducting) interrogated with input data representing a binary '0'. Device D7 therefore gates the complement bit line (high) to the gate control of device D9 switching it on pulling the sense line voltage down indicating a mismatch. Finally, a cell storing a binary '0' interrogated with input data representing a binary '0' has no effect on the sense line potential indicating a match condition.

In order to search the contents of the array for a particular word, all the bit line pairs 12 are energized with a pattern of differential signals representing the individual bit values of the input data word. Since all cells in the same row are connected to the same sense line (except where a sense line is split into two parts as mentioned previously and to be described in more detail hereinafter), the potential of the sense line will only remain high if all the data inputs are equal to the contents of the cells in the word. In other words, any mismatch between the inputs and its associated cell causes the sense line voltage to be pulled down. This search procedure interrogates the entire array with each input data word resulting in all matches being indicated by the sense lines associated with the matching words in the array remaining at a high potential.

Figure 6:
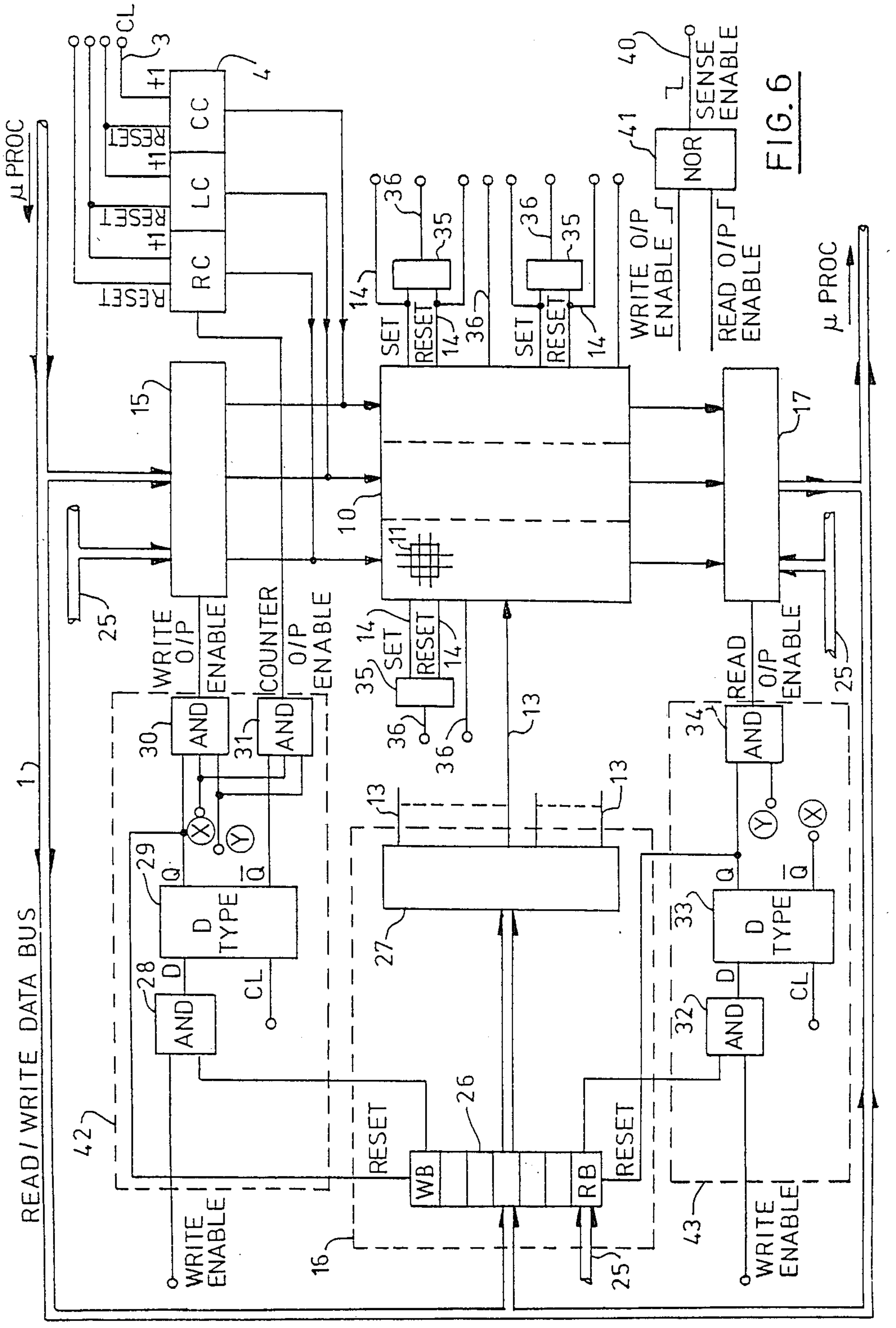
FIG. 6 shows a preferred embodiment of the CRT controller in accordance with the present invention.

The system organization of the controller using an associative array 10 will now be described with reference to FIG. 6. Since the array is writable its information content can be changed by re-programming, an important feature of this invention enabling the controller to operate on any display configuration. The count values of the various words are loaded into the array from data write register 15 during data write time under control of write enable circuit 42 with the word row address coincidently selected by word address register 16. Counter 4 providing a running count during screen scanning is applied during search time also under control of circuit 42 as the search argument for the associative array. Each match condition detected between the running count of counter 4 and the pre-set words in the array produce signals on the associated sense lines 14 to set or re-set latches 35 and produce control signals on latch output lines 36 are supplied directly to the CRT control circuits.

As has been mentioned herebefore the counter 4 is in effect three counters in one with the low order section CC counting character positions in a row, the mid order sections LC counting lines or slices in a character, and the high order RC counting character rows on the complete screen. The counter is incremented at the character rate of the display system under control of character clock CC pulses supplied over clock input line 3. A low order character counter CC accumulates the character count in each row of the display until it is re-set by an end of scan row signal from the associative array. This signal applied to line CC (re-set) re-sets the low order character counter CC and increments the next stage namely the line or slice counter LC by unity. When the required number of slice lines making up a complete character row have been incremented an end of slice signal, from the associative array re-sets the line counter LC and increments the character row counter RC by unity. This process is repeated defining the number of character positions in each scan line, the number of scan lines in a character row, and the number of rows in a complete frame scan. The necessary synch and line blanking signals are generated by the array at the appropriate times in like manner.

In view of the nature of the count procedure adopted, the organization of the contents of the associative array 10 is similarly structured and is shown in the figure notionally subdivided into three vertical sections. The right-hand section is loaded with pre-set count values which are to be compared to the character counter CC contents; the middle section is loaded with those count values which are to be compared to the line or slice counter LC contents; and the left-hand section is loaded with those count values which are to be compared to the character row counter RC contents. Accordingly in view of this organization of the associative array, it is convenient to load the data write register 15 (24 bits) in sequence with three 8 bit bytes supplied one at a time over data bus 1. Three bits of a seven bit address bus 25 specifies to which of the three byte boundary of the data write register the 8-bit input pattern is to be written. When a complete word has been loaded in the data write register 15 it is then written during write time into the selected row of the array as described hereinbefore.

The word read/write select register 16 consists of a 7 bit address register 26. One bit position of this register is reserved for a 'write bit' which is set when a write operation is to be performed and another for a 'read bit' which is set when a read or test operation is to be performed. One bit on address line 25 determines which of the two bits controlling read or write shall be set depending on the operation to be performed. The remaining five bits are supplied over the data bus 1 and are decoded by decoder 27 to a single read/write select line 13 associated with the selected word line of the array. The output of data from the data read register 17 resulting from an interrogation of the contents of a word in the array is also controlled on a byte-by-byte basis by means of a three bit address supplied over the address bus 25 specifying the order in which the three bytes contained in the register are to be read out in sequence to the bus 1.

Since the associative array 10 contains words which are required to be compared with the running character count and the resultant event matching is used as the video timing controls for the display device, it is important that no write operations are performed during the time that the video signals generated by the event matching are required to control the CRT. Consequently the period selected to write new words in the display, that is, the write period referred to hereinbefore, is limited to a period immediately following the generation of a 'write enable' signal generated typically during frame fly-back period or any other time of low control activity.

The 'write enable' signal generated in the same manner as other control signals by an event match in the array is supplied as one input to AND-gate 28 forming part of the write enable circuit 42. The 'write' bit of address register 26 is connected as the other input. The output from AND-gate 28 is supplied to the data input of D-type latch 29. The character clock CL is connected to the clock input of the latch so that when the write bit of register 26 is set, and the write enable signal is high, the gated high output from AND-gate 28 is clocked as a high level signal onto the Q output of the latch 29, and a low level signal on the $\overline{Q}$ output. The Q output from latch 29 is used to re-set the write bit of register 26 disabling the AND-gate 28 and is further applied as one input to three input AND-gate 30. Since writing to the array cannot be permitted during a read operation, an input X to the AND-gate is supplied from the read control circuitry and provides a write inhibit when a read operation is in process. The third input Y to the AND-gate 30 prevents writing during pre-charging of the bit lines. This input Y, is the inverse of the signal on the pre-charge input line 22. Thus, provided the write bit of register 26 is set, the write enable signal from the array is high, and the pre-charging of the bit lines is complete, a write output enable signal is supplied from AND-gate 30 (the last stage of the write enable circuit 42) to the data write register 15 to enable its output to be applied to the bit lines of the associative array. Since AND-gate 28 is disabled, the write output enable is only up for one character clock time during which associative store updates for example cursor positions may be entered.

Since no counter output is permitted to access the array during this write mode, the $\overline{Q}$ output from the latch 29 is applied to AND-gate 31 together with the same X and Y inputs as are applied to AND-gate 30. A high output from AND-gate 31 is the counter output enable signal supplied to counter 2 to enable its output to be applied to the bit lines of the array. This time multiplexing operation results in the counter being connected to search the contents of the array for the majority of the scan period when the controller is in search mode and with the data write register being connected for one character clock time when the controller is in write mode.

Figure 5:
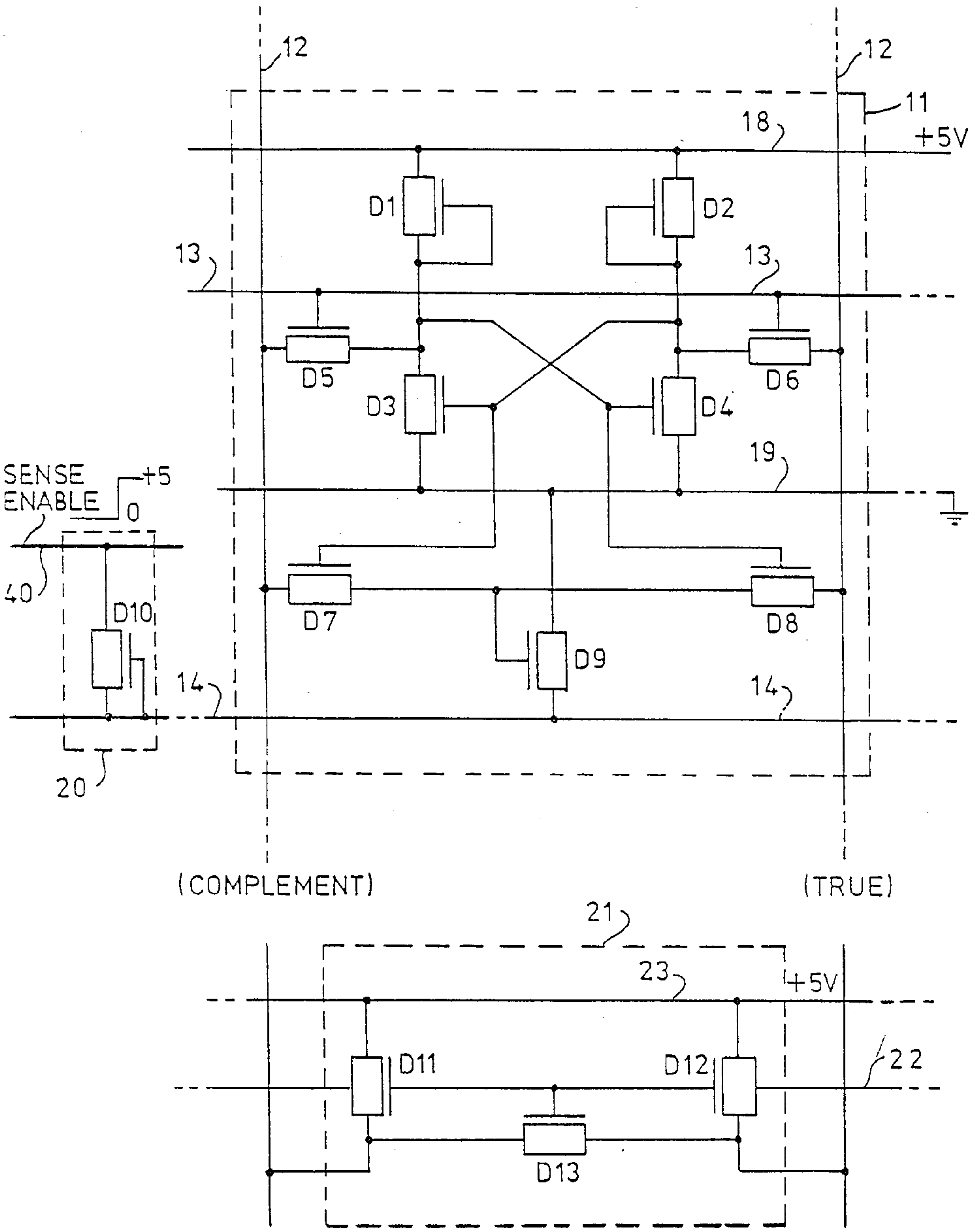
FIG. 5 shows a cell forming the basic building block for the associative array forming part of the CRT controller shown in FIG. 4.

The read circuitry is controlled in like fashion. Thus the read bit of the address register 26 is connected as one input to AND-gate 32 included in the read enable circuit 43 with the write enable signal supplied as second input. The output from AND-gate 32 is connected to the data input of D-type latch 33 clocked by the character clock of the display system. The Q output is used to re-set the read bit and thus disable AND-gate 32 and supplied as an input to AND-gate 34 also provided with the Y input which is the inverse of the pre-charge signal supplied to input line 22 (FIG. 5). Thus provided the read bit of register 26 is set, the write enable signal from the array is high, and the pre-charging of the bit lines is complete, a read output enable signal is supplied from AND-gate 34 to the data read register 15 to enable the contents of the interrogated word of the array to be loaded therein. The $\overline{Q}$ output from latch 33 is high unless a read operation is taking place and this is used to supply the X input to AND-gate 31 of the write control circuitry.

The only exception to this procedure is during initialization of the controller when no words are contained in the array and consequently no write enable signal can be produced from the array to perform the timing control. Accordingly during this period the write enable inputs to AND-gates 28 and 32 are held high by the controlling microprocessor at least until the word specifying the timing of the write enable signal has been written to the array.

The sense enable signal referred to with reference to Fig. 5 is conveniently generated from the logical NOR of the write output enable from AND-gate 30 and the read output enable from the AND-gate 34. This logical function producing the sense enable signal on output line 40 is shown separately in the lower right-hand corner of FIG. 6 for convenience. The NOR gate 41 output on line 40 is down when either of the inputs from AND-gate 30 or 34 are high.

Figure 7:
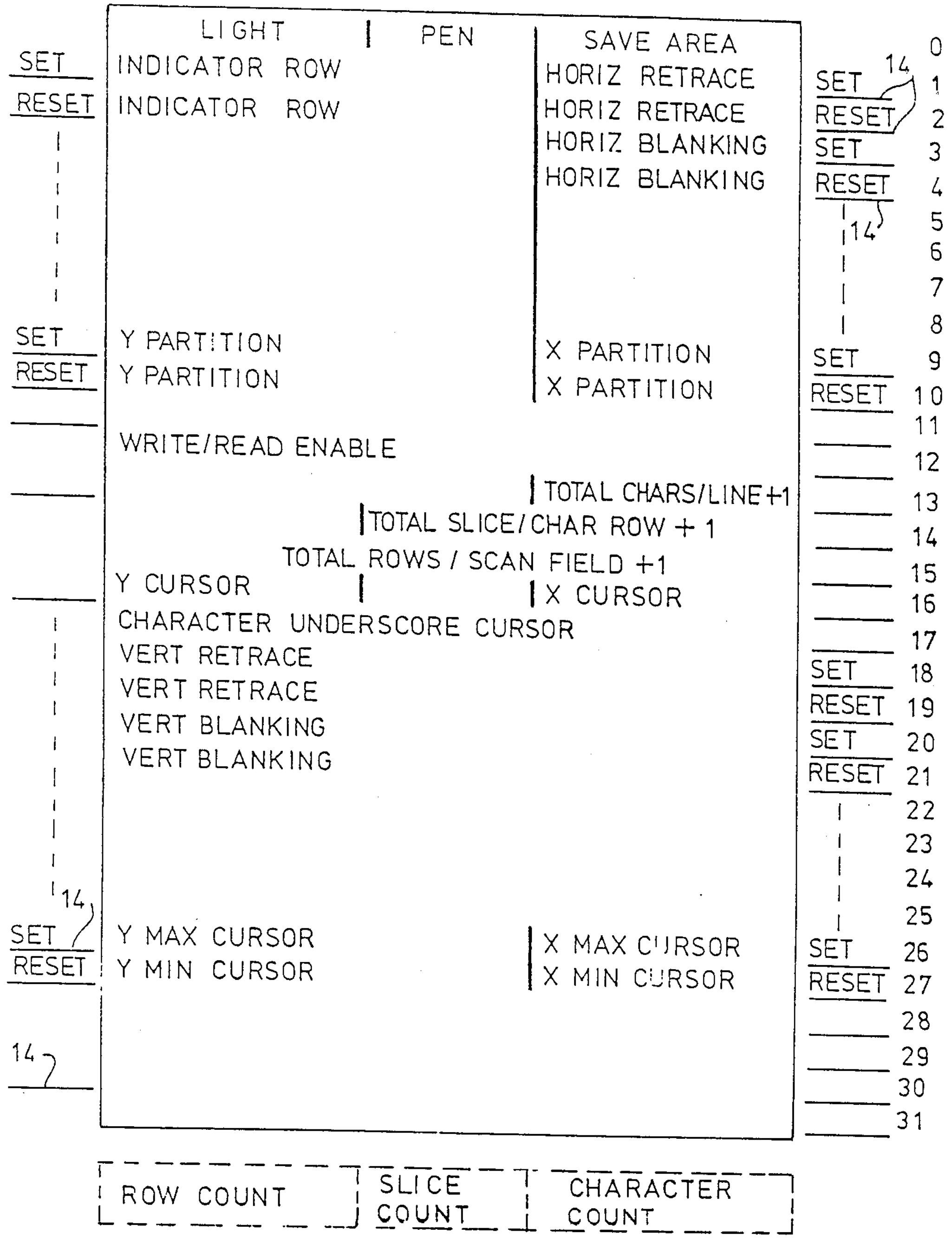
FIG. 7 illustrates the configuration of the associative store containing some words to generate typical video control signals for the CRT to which the controller is to be connected.

Some words for generating control signals typically required by a CRT controller are shown stored in an associative array in FIG. 7. In this example 32 rows of the array are available in which control words may be stored. In some cases the whole line is required but in many cases two words are stored in a single row of the array.

Consider for example word 16 in the array for positioning a character block cursor in the screen. The left-hand output is Y CURSOR and an output on its sense line 14 indicates the character row containing the character to be highlighted by the character block cursor. The consequence of this is that the Y character block cursor signal only appears on a video control line during the scanning of the rows in which the cursor is to appear. This output signal is only a function of row count and is independent of the values of the slice count and character count. Consequently, the sense line for this word is disconnected on the boundary of the notional row count column and slice count column in the array. Similarly the X CURSOR specifying which character position of the row is to be marked by the character block cursor is only a function of the character count value and its sense line is broken at the notional boundary between the slice count and character count. This division or breaking of the sense line provides the 'don't care' state that would otherwise be required as well as the additional terms for event matching the logical AND of these two events gives the character position on the screen to be marked by the character block cursor.

In contrast the CHARACTER UNDERSCORE CURSOR word in row 17 of the array contains row, slice and character information and therefore occupies an entire row of the array. In operation, a match of this word occurs when the scanning electron beam of the CRT has reached the character position on the scan line immediately below the displayed character to be marked. The output signal from the array is used directly to bright-up the beam thus underscoring the character in conventional manner.

The linear extents of the X and Y lines constituting a cross-hair cursor are specified by the two words stored in the right-hand portions and the left-hand portions of rows 26 and 27 respectively. Here, since the length of the Y line is dependent on row and slice information and the length of the X line is only dependent on character information, the sense lines for the rows 26 and 27 are disconnected on the slice/character boundary of the array. In operation, an output signal from the left-hand Y MAX CURSOR word of line 26 sets a latch 35 (FIG. 6). The latch is re-set by the Y MIN CURSOR from the left-hand of line 27. The consequence of this is that the Y cross-hair line only appears on a video control line 36 during the scanning of the rows defined by the latch being on. Similarly the X MAX CURSOR output from the right-hand of row 26 sets a latch and the X MIN CURSOR output from the right-hand of row 27 re-sets the latch. The output from this latch defines the length of the X cross-hair line on the defined scan line.

Events timed on each individual scan row of the display only require a pattern of bits in the right-hand section of the associative array from where they are compared with the character count values from the character count section of the counter 2. Thus right-hand word 1 defines the start of a HORIZONTAL RETRACE pulse and a match is used to set a HORIZONTAL RETRACE latch. The latch is subsequently re-set by the matching of the right-hand word 2 the value of which defines the termination of the retrace pulse.

Other words held in the right-hand portion of rows 3 and 4 of the array provide set and re-set timing signals respectively for the HORIZONTAL BLANKING signal for the display. The start and finish points along a scan row of a display partition may also be defined in this manner and words defining the X PARTITION set and re-set conditions are included in the right-hand portion of rows 9 and 10 respectively. The extent of the scan partition in the vertical direction is similarly defined by the Y PARTITION set and re-set lines in the left-hand portion of lines 9 and 10. The X PARTITION word is compared with the contents of the character count CC, whereas the Y PARTITION word requires comparison with both row counter RC and slice counter LC values. The row and slice number of two words written in the left-hand portions of rows 1 and 2 set and re-set a latch to define the position of an INDICATOR row into which fixed information on the screen, e.g. timer, is displayed. The write enable signal which is used as the aforementioned enabling input to AND-gates 28 and 32 (FIG. 6) to control write and read operations respectively is stored in row 12 of the array. VERTICAL RETRACE and VERTICAL BLANKING signals are derived following comparison of the words stored across the entire array in lines 18 to 21 to be compared with the running count contents of the row RL and slice LC and character counters.

The re-set and increment signals for counter 4 are also generated by words held in the array and which produce the appropriate signals as required. The right-hand portion of line 13 contains the count value (TOTAL CHARACTERS PER LINE+1) which is used at the end of each scan line row to re-set the character counter CC and increment the slice counter LC. Similarly the right-hand portion of line 14 contains the count value (TOTAL SLICE/CHARACTER ROW+1) used to re-set the slice counter LC and increment the row counter RC. The word 15 contains the (TOTAL ROWS/SCAN FIELD+1) used to re-set the row counter RC at the end of a field scan.

Finally, a further useful feature of this controller is that the associative array can also be used as an event memory for example to save the screen position of a light pen. In order to achieve this, one row of the array (row 0) is reserved and a light pen operating signal generated when a light pen position is detected at the screen surface is applied to light pen input line 44 connected directly to the read/write select line 13 of row 0 of the array. The light pen operating signal provides an identical function as a read/write select line resulting in the current running count value in the counter 4 being written into row 0 of the array. This light pen position information is subsequently interrogated by a read operation and the position information returned to the microprocessor over bus 1 for processing.

The CRT controller in accordance with the present invention is a versatile component having considerable advantages over conventional controllers. In theory such a controller could be produced with every row of its associative array connected at both ends to either a set or re-set input of a latch and also provided with by-pass conducts. Each sense line would be supplied intact across the entire row but would be provided with fusible connections at the character/slice and slice/row boundaries. The sense line conductors could subsequently be broken by laser action for example to provide the configuration required for the specific application. By this means, the user is given complete flexibility of design.

In practice, the controller would probably be custom-built with the sense line divisions and output arrangements provided to suit the more common display function controls. In addition however additional rows would be made available to the user to program additional functions as required.

1. A CRT controller operable in use to generate video timing control signals for a CRT to which it is connected, the individual timing of each timing control signal being determined with reference to the running count value of a counter connected to receive and be continuously incremented by an input pulse train derived from the scan controlling clock of the CRT, characterized in that said controller comprises an associative storage array (10) into which, during a write mode of operation, words each representing by its binary content a predetermined count value are written, said running count value available during a search mode of operation from a counter (4) 2 as an incrementing sequence of binary signals being applied to said array as a search argument, whereby each individual timing control signal is provided as a respective output signal from the array in response to the occurrence of a match between the binary signals representing the current running count value and the binary content of a predetermined word count value stored in the array for the purpose of defining that timing control signal.

2. A CRT controller as claimed in claim 1, in which said associative storage array includes a matrix array of cells (11) interconnected in columns by common bit line conductors (12) extending in the column direction and interconnected in rows by both common word select line conductors (13) and common sense line conductors (14) extending in the row direction, said counter having as many stages are there are cells in a row, and being connected one stage per row to the corresponding bit lines in the array, whereby in operation, the running count value is presented as an incrementing sequence of binary values to the bit lines of the array, the controller further comprising a data input register (15) having as many stages as there are cells in a row, connected one stage per row to the corresponding bit lines in the array, a word line address register (16) having as many stages as there are cells in a column, connected one stage per column to the corresponding word select line conductors in the array, and enabling means (41) operable in said write mode to permit binary signals derived from a word held in said data input register to be applied to the bit lines of the array in order that the word may be written in the array and during this time to inhibit the output from said counter, and operable during said search mode to permit binary signals derived from the running count held in said counter to be applied to the bit lines of the array in order that an associative search may be conducted for matching words in the array and during this time to inhibit the output from said data input register.

3. A CRT controller as claimed in claim 2, in which said controller further comprises a data read register (17) having as many stages as there are cells in a row, connected one stage per row to the corresponding bit lines in the array, and further enabling means (43) operable in read mode to permit binary signals derived as a result of interrogation of a word stored in the array to be read into the data read register and during this time to inhibit the output from the data input register and the counter.

4. A CRT controller as claimed in claim 3, in which the counter is provided as three cascaded counter stages, a first stage (CC) incremented by said controlling clock and reset by a character row count from said associative array flagging an end of line, a second stage (LC) incremented by the re-set signals for the first stage and itself re-set by a character slice count from said associative array flagging the completion of a complete character row, and a third stage (RC) incremented by the next signal for the second stage and itself re-set by a row count from the associative array flagging the completion of a complete field.

5. A CRT controller as claimed in claim 4, in which the sense lines 14 of a pre-selected number of rows of the associative array are each discontinued at a predetermined point along its length to enable one word to be stored in the cells associated with one continuous portion of the sense line and another word to be stored in the cells associated with the other continuous portion of the same sense line.

6. A CRT controller as claimed in claim 5, in which selected sense lines or part sense lines are each connected to the set input of a latch (35) and other selected sense lines or part sense lines are each connected to the re-set input of a latch by which means the timing and duration of a video control signal from the output (36) of such a latch may be defined by the predetermined count values of the two words associated therewith.

7. A CRT controller as claimed in claim 6, in which each sense line connected to a set or re-set input of a latch is further connected to an output conductor by by-passing the latch by which means a match signal from the word associated with that sense line may be used to set or re-set the latch as aforesaid or be accessed from the by-pass conductor and used as a direct control for the CRT.

8. A CRT controller as claimed in claim 7, in which one or more rows of said associative array are reserved for event time recording, means connected the word select line of such a reserved line operable at the instant of occurrence of an event to be timed, to cause the running count value contained in the counter to be written in the reserved row associated therewith.

* * * * *